United States Patent [19]
Altares, Jr.

[11] 4,020,133
[45] Apr. 26, 1977

[54] ANTI-LUMPING COATING FOR POLYSTYRENE BEADS

[75] Inventor: Timothy Altares, Jr., Valencia, Pa.

[73] Assignee: ARCO Polymers, Inc., Philadelphia, Pa.

[22] Filed: Aug. 2, 1976

[21] Appl. No.: 710,939

[52] U.S. Cl. .............................. 264/53; 260/2.5 B; 260/8; 264/DIG. 9; 427/222

[51] Int. Cl.² ......................................... B29D 27/00

[58] Field of Search ................ 427/222; 260/2.5 B; 264/53

[56] References Cited

UNITED STATES PATENTS

| | | | |
|---|---|---|---|
| 3,301,812 | 1/1967 | Ferrigno | 260/2.5 B |
| 3,429,737 | 2/1969 | Marsden | 260/2.5 B |
| 3,908,069 | 9/1975 | Muirhead | 260/2.5 B |

Primary Examiner—Morton Foelak
Attorney, Agent, or Firm—John R. Ewbank

[57] ABSTRACT

A complex is formed by the reaction of an aluminum salt such as aluminum sulfate with a high molecular weight (for example, above 60,000 M.W.) collagen. Collagen-aluminum complex is dispersed in water and serves as suspension agent for suspending polystyrene beads during impregnation of a blowing agent, even when the concentration of the suspending agent is of the magnitude of 0.05% by weight of the beads. The aqueous system is drained from impregnated expandable beads, which are washed, but which retain adherent deposits of said collagen-aluminum complex in measurable amounts. The dried coated beads have minimized propensity toward lumping when pre-expanded. The prepuffed particles can pass tests concerned with resistance toward static electrical phenomenon better than corresponding prepuffed particles lacking such deposit of collagen-aluminum complex.

2 Claims, No Drawings

ANTI-LUMPING COATING FOR POLYSTYRENE BEADS

FIELD OF INVENTION

This invention relates to the coating of expandable polystyrene beads for enhancing the propensity of the beads to avoid lumping during pre-expansion and for resisting static electrical phenonomen both in the pre-expanded and in the unexpanded forms.

PRIOR ART

Wright U.S. Pat. No. 3,520,833 describes the coating of polystyrene beads with lecithin to impart anti-lumping propensities to the beads. Altares U.S. Pat. No. 3,819,546 and Altares U.S. Pat. No. 3,826,765 describe methods of coating polystyrene beads with methyl methacrylate polymers to impart anti-lumping characteristics thereto.

A considerable variety of literature notes that polystyrene beads and the prepuff particles acquire static electric charges tending to make the flow of the particles quite different from the flow characteristics of metal balls. Coatings of zinc stearate on polystyrene particles decrease the susceptibility to static electrical problems. Notwithstanding the decades of problems related to lumping and static electrical phenomena, prior technologists have been unable to achieve all of the desired anti-static and anti-lumping characteristics.

SUMMARY OF THE INVENTION

In accordance with the present invention polystyrene beads are coated with the complex resulting from the reaction of an aqueous solution of an aluminum salt such as aluminum sulfate and an aqueous dispersion of a high molecular weight (for example above 60,000 M.W.) collagen. This coating is applied by using an aqueous system in which such complex serves as a suspending agent, notwithstanding the fact it is present in a very low concentrate such as about 0.5% by weight of the polystyrene beads. The method of the present invention features with use of the complex as a suspending agent during the impregnation of the beads with a blowing agent. The subsequent recovery of the impregnated beads involves draining said aqueous system from the beads whereby a coating of said complex is deposited on the polystyrene beads. The amount of the complex coated onto the polystyrene beads is so small that the conventional steps of removing the suspending agent can be bypassed. Such deposit of complex on the beads is resistant to ordinary washing. The washed beads can be dried. After the beads have been dried, the amount of the complex on the beads is not conspicuous but measurable in parts per million. The thus coated and treated beads, as well as the prepuffed particles derived therefrom have significantly reduced propensities to show the effects of static electricity in certain tests concerned with static electrical phenomena. Moreover, the coated beads can be subjected to pre-expansion to provide prepuffed particles having advantageously reduced propensity toward lumping.

STATIC ELECTRICAL PHENOMENA

Polystyrene beads and prepuffed particles are able to acquire either a positive static charge or a negative static charge depending upon the conditions of electrification. To the extent that a batch of particles acquires the same charge, there is a propensity for the particles to be repelling one another, and thus to separate when flowing through an open zone. There are propensities for the formation on container walls of monolayers of commonly charged particles. Some of the problems of common charged particles can be dealt with by adequate grounding of the static charges, but because there is a time lag between efforts to ground and adequate dissipation of the static charge by grounding, the polystyrene foam industry has sought anti-static treatments for polystyrene beads.

One of the reasons why static electrical phenomena for polystyrene particles is so troublesome is because of the aggregative type of static electrical phenomena. When a large number of particles bearing multiple and varied charges are brought together, there is a propensity toward aggregation of the particles. Such aggregative tendencies impart a resistance to flow among the affected particles. Such characteristics are long lasting and are not readily dissipated by grounding. The spherical shape of the polystyrene particles tends to promote gravitational flow of particles to a monolayer condition unless static electrical phenomena of the aggregative type permit the piling up of these spherical particles. The mounds of such aggregated particles do not have steep sides nor are they ordinarily very high because the aggregative type of static electrical phenomena involves inter particles forces which are small, but still troublesome when large numbers of particles are employed. The angle of repose of the electrically charged spheres is generally smaller than the angle of repose observed in piles of non-spherical particles.

Tests were devised to induce and to detect the aggregative type of static electrical phenomena. Induction was mainly be violent agitation in an insulated container using a strong stream of dry nitrogen gas. An expanded polystyrene board was made into a tray having a bulls-eye and a plurality of annular zones there around. An open ended cylinder was placed at the bulls-eye. The cylinder was filled with the batch of polystyrene prepuffed particles being tested. When the cylinder was lifted up to permit the polystyrene prepuffed particles to spread throughout the tray, the particles would spread as a monolayer in the absence of static electrical phenomena. When the aggregative type of static electrical phenomena was troublesome, the particles were piled as a mound near the bulls-eye.

Said testing tray was also provided with a series of holes having diameters from 4 to 13 millimeters, such holes being positioned at one end of the tray. When the tray was tilted so that the particles could flow through the holes, there would be no clogging of the holes in the absence of aggregative type of static electrical phenomena. In the event of aggregative static electrical phenomena of a severe nature, even the 13 millimeter hole would be clogged by this test procedure. Relatively minor degrees of static electrical phenomena could lead to the clogging of holes having a smaller diameter while permitting the flow through the larger holes.

In another test, a standard funnel was filled with the particles and the time needed for the flow through the funnel was measured. In another test for the conventional single charge type of static electrical phenomena, a glass jar containing a few layers of polystyrene particles was shaken up and down 50 times and then the extent to which there was any clinging of particles near the neck of the jar, thus indicating the presence of a group of particles having the same charge, was observed.

Polystyrene prepuffed particles can be electrified by rubbing against grounded metal. Much of the problem in the handling of prepuffed particles in a molding apparatus is attributable to such static phenomena from mechanical contact with grounded metal. An apparatus was devised involving the circulation of polystyrene spherical particles about a closed path including several grounded sections and several plastic sections. Polystyrene particles readily acquire static electrical charges when entrained in a gas stream flowing through polyvinyl chloride tubing. The test apparatus directed polystyrene prepuffed particles and dry nitrogen gas through the closed path comprising several sections which alternately were grounded metal tubing and PVC tubing. Detectable clinging to walls can be observed soon after start up. The time until intermittent blockage is observed and recorded as useful information, but the time until complete blockage of flow is achieved (if less than some reasonable cut-off point) is the particularly significant observation in this test. Coatings of zinc stearate on appropriate polystyrene particles can increase the blockage time from less than an hour to more than a day, thus indicating that static electrical phenomena, though baffling, are amenable to treatment.

DETAILED DESCRIPTION OF INVENTION

The invention is further clarified by reference to a plurality of examples.

EXAMPLE 1.

In an apparatus for the suspension polymerization of styrene, an aqueous system is agitated so that monomeric styrene is dispersed in the aqueous suspension, the suspending agent minimizing the possibility of a clustering of the suspended particles. The catalyst concentration, pressure, temperature, and other reaction conditons are controlled to achieve the desired degree of polymerization after which the reaction is quenched. The aqueous system is drained from the approximately spherical beads of polystyrene. The beads are washed and treated for the removal of trace amounts of the suspending agent, such as by treatment with aqueous acid. The polystyrene beads can be stored, or used in the production of solid polystyrene articles, or converted to expandable beads by impregnation with a blowing agent.

An expandable polystyrene bead is an approximately spherical particle of a polymer consisting predominantly of polystyrene but possibly modified by the presence of fire retardants, chlorinated polystyrene and/or other modifiers, and containing from about 3% to 7% of a blowing agent capable of expanding when the bead is subjected to a moderate temperature such as a temperature within the temperature range of low pressure steam. The polystyrene beads are impregnated with the blowing agent in an impregnating vessel. Text books such as Bishop, "Practical Polymerization of Polystyrene" published by Cahners (1971) describe some of the typical impregnation procedures. Introducing the blowing agent into the impregnation vessel, heating the agitated aqueous system under pressure, and cooling the agitated dispersion are general features. The blowing agent is impregnated into the polystyrene beads under conditions of elevated temperature and pressure so that the blowing agent is retained in the expandable bead subsequent to the impregnation. It is customary to retain the expandable beads under storage conditions intended to minimize volatilization of of the blowing agent and to employ the expandable beads within a reasonable time subsequent to their manufacture. Improperly stored and/or stale beads do not expand sufficiently during pre-expansion to meet the specifications for prepuffed particles.

Tricalcium phosphate is ordinarily employed as a suspending agent for the impregnation of the blowing agent. There is somewhat greater freedom concerning the choice of suspension agent for the impregnation step than for the bead-forming step. This invention is particularly concerned with the choice of the suspension agent for the impregnation step and the processing of the expandable beads subsequent to such impregnation.

The impregnation vessel is filled with water and modified by the addition of the suspension agent and/or other modifiers. A batch of beads such as a batch weighing about 50% of the water is added to the system which is agitated so that the suspension agent promotes the suspension of the beads. The agitated suspension of polystyrene beads in the aqueous system is heated under pressure to the impregnation conditions. The blowing agent may be introduced after the system has been raised to an impregnation temperature or the blowing agent can be introduced with the initial reaction mixture.

In a group of control tests, the aqueous system was modified by the addition of a collagen to the system followed by the impregnation of the beads. Such beads were pre-expanded using low pressure steam and the amount of cluster formation was observed. In each of Controls A, B, C, and D, there was no cluster formation indicating that the suspension agent was functioning in its intended manner during such impregnations. In Controls A and B, a collagen having a molecular weight of 40,000 was employed in concentrations of 0.5% and 1.0% based upon the weight of the suspended beads. The speed of flow of the prepuffed particles through a funnel was measured. The prepuff (Control A) derived from 0.5% of such collagen required 2.57 minutes for the flow of the standard volume of particles. The prepuff (Control B) derived from the system containing 1.0% of the 40,000 molecular weight collagen required 1.51 minutes. Because the flow time was less for Control B than Control A, the aggregative type of static electrical problems were less for Control B than for Control A.

In Control A, 11% of the prepuffs aggregated into lumps, but by increasing the concentration of the 40,000 molecular weight collagen to 1.0% in Control B, no lumping occurred.

In Controls C and D, the collagen had a molecular weight of 80,000. In Control C, in which 0.5% of such collagen based upon the weight of the beads was utilized, the beads of Control C formed 6% lumps, but there were no lumps when, in Control D, the amount of the collagen was increased to 1.0%. The beads of Control C flowed through the funnel in 1.47 minutes. A standard volume of Control D beads flowed through the funnel in 1.31 minutes. By a series of tests similar to those of Controls A through D, it was established that the collagen should have a molecular weight of at least 60,000. It should be noted that weight for weight, the 80,000 molecular weight collagen was superior to the 40,000 molecular weight collagen, both in the minimization of static electrical problems (as evidenced by the speed with which the beads flowed through the funnel) and in minimization of lumping.

A series of controls were conducted using various salts in various combinations with the collagen of 80,000 molecular weight material in the aqueous system. In Control E, zinc stearate was combined with the collagen to provide the suspension agent containing 0.1% collagen and 0.03% zinc stearate. In said Control E, the clusters were 1.1% and the funnel flow time was 0.5 minutes. Calcium chloride in a concentration of 0.03% formed a complex with such 0.1% collagen in Control F. The complex did have anti-lumping characteristics, so that there were no lumps upon pre-expansion of the beads. The funnel flow time was 0.47 minutes. About 2.4% clusters formed in Control F. In Control G, the use of 0.03% magnesium sulfate and 0.1% 80,000 molecular weight collagen for the complex resulted in 2.9% clusters during impregnation. The beads had a funnel flow time of 0.44 minute. The resulting prepuffed particles were completely non-lumping.

In Example 1, a complex was prepared by the reaction of 0.03% aluminum sulfate and 0.1% 80,000 molecular weight collagen. The resulting beads could be expanded to prepuffed particles with no lumping. The flow time for the beads through the standard funnel was 0.45 minutes. In each of Controls D, E, and F, and in Example 1, the silicone oil was added to the final slurry in the latter stages of the impregnation step, such silicone oil being present in a concentration of 0.02% based upon the weight of the beads.

By a series of tests it was established that the concentration of the aluminum sulfate should ordinarily not be less than about 0.03% by weight of the polystyrene beads and that the concentration of the collagen should be not less than about 0.02% collagen. In Control J, the concentration of the collagen amounted to 0.015% by weight of the polystyrene beads. The aluminum sulfate concentration was 0.03%. This complex was not a perfect suspension agent because there were clusters during impregnation amounting to 0.4% of the beads. The beads flowed through the standard funnel in 0.35 minutes. There were no lumps in the prepuffing. When the prepuffs were electrified and directed through the assortment of holes, the flow was blocked by holes smaller than 8 millimeter, but there was flow through the holes which were 8 millimeter and larger.

In a series of tests it was established that the aluminum salt may be aluminum chloride, aluminum nitrate, aluminum sulfate or aluminum acetate.

Some polystyrene cups were prepared from the prepuffed particles of the present invention. The cups were subjected to a biological test over a period of 6 weeks during which they were maintained in a hot humid environment of a type tending to stimulate the formation of mold. As a control, a sample of wood was placed in this chamber and did develop significant mold during the 6 week test. However, the polyurethane cup did not show any mold growth. Although the amount of collagen aluminum salt complex on the beads is detectable and measurable, it is much too small to lead to the problems of promoting biological growth such as molds.

EXAMPLE 2.

An impregnation vessel is provided with water and there is dispersed therein an amount of 80,000 molecular weight collagen corresponding to 0.1% by weight of the aqueous system. An amount of a mixture of ethyl ether trichlorofluoromethane and normal pentane (equal molar mixture) corresponding to 4 weight percent of the aqueous system is added to the impregnating vessel. Polystyrene beads predominantly of 2 millimeter size are introduced into the impregnation vessel. The beads constitute 50% by weight of the water, so that the concentration, based on the beads, of the collagen complex is 0.2% and the concentration of the blowing agent is about 8%. The system is agitated, heated under pressure and the blowing agent is impregnated into the beads without troublesome clusters forming. The aluminum complex of the collagen is formed by addition of aluminum nitrate providing an amount of aluminum corresponding to 0.5% of the aqueous system or 50% of the collagen concentration. After the impregnation, the aqueous system is drained from the beads, which are thereafter washed with water. The collagen aluminum complex is deposited as a residue on the surface of the polystyrene beads and cling so tenaciously that it is not readily washed off in the washing step. Detectable amounts of the collagen can be found on the outer surface of the beads. The presence of the aluminum component of the complex can also be analyzed. The concentration of the aluminum complex in the surface scrapings is of the magnitude of 500 parts per million, but when applied to the total weight of the beads the concentration is of the magnitude of a few parts per million. Notwithstanding such small concentration, the collagen aluminum complex is very effective as an anti-lumping agent. The beads impregnated by the use of the collagen aluminum complex suspending agent can be pre-expanded with formation of no lumps. The anti-lumping effectiveness of the collagen aluminum complex is outstanding partly beacause such small concentrations achieve zero lumping. Moreover the prepuffs resulting from the collagen aluminum complex coating can be electrified and subjected to the testing tray and flow through smaller holes than prepuffs resulting from impregnation with other suspending agents such as tricalciumphosphate.

EXAMPLE 3.

The procedure of Example 2 was generally followed and the advantageous results of a freedom from lump formation and a superior performance in the flow of the electrified particles through the holes in the tray was observed. The amount of the complex of collagen and aluminum salt was 0.8% of the beads and the concentration of the aluminum ion was about 25% of the weight of the collagen.

EXAMPLE 4.

In a series of tests the concentration of the collagen with respect to the beads and the concentration of the aluminum with respect to the collagen are varied for establishing the feasibility of the range from 0.2% to about 1% for the collagen and from about 20% to about 200% for the concentration of the aluminum ion with respect to the collagen. The static characteristics sometimes are improved as the concentration of the aluminum ion was increased.

The blowing agent impregnation method of the present invention involves a combination of steps of preparing an aqueous system containing from about 0.02% to about 1 % collagen having an average molecular weight of at least 60,000; preparing the complex resulting from the interaction of an introduced aluminum ion of a water soluble aluminum salt with said collagen in said aqueous system, the weight concentration of the aluminum ion introduced being from about 20% to about 200% of the weight concentration of the collagen; agitating and dispersing said complex in said aqueous system; suspending approximately spherical beads of a polymer which is predominantly polystyrene in said agitated dispersion, relying upon said complex as the major suspending agent, the aqueous suspension of the beads being in an impregnation vessel; introducing blowing agent into said impregnation vessel containing said aqueous suspension of beads and controlling the sequence of pressure and temperature to impregnate blowing agent into said beads and to cool the impregnated beads, the said blowing agent being selected from the inert organic materials consisting of $C_2$–$C_7$ hydrocarbons, halogenated hydrocarbons having a volatility within the volatility range of said $C_2$–$C_7$ hydrocarbons, ethers having a volatility range of said $C_2$–$C_7$ hydrocarbons, and mixtures thereof, said impregnation introducing from about 3% to about 7% blowing agent into said beads, draining aqueous material from the impregnated beads and removing said impregnated beads from said impregnating vessel and washing the beads, a measurable amount of said complex of collagen and aluminum salt being a wash-resistant deposit on the exterior of the bead; and withdrawing said washed beads as the product of the method, said beads being suitable for the molding of an article havng a predominant volume of cellular polystyrene by steps comprising pre-expanding beads at a temperature in the temperature range embraced by low pressure steam to prepare pre-puffed particles, filling a mold with said prepuffed particles, and subjecting the mold to heating and cooling to form said article, said beads having surface deposits of a complex of an aluminum salt and a collagen having a molecular weight of at least 60,000, said deposits being present on the bead surface in measurable amounts and being adhered sufficiently tenaciously to resist mild washing and said deposits promoting the formation of prepuffed particles having significantly fewer lumps than the prepuffed particles derived from corresponding beads lacking such deposits, and said prepuffed particles passing static electrical tests better than the prepuffed particles derived from corresponding beads lacking such deposits.

The expandable bead of the present invention can be described as a bead suitable for the production of a predominantly polystyrene cellular article by steps comprising pre-expanding beads at a temperature in the range of low pressure steam to prepare prepuffed particles, filling a mold with said prepuffed particles, and subjecting the mold to heating and cooling to form said cellular article, the main body of said bead consisting essentially of a blowing agent and a polymer which is predominantly polystyrene, such polymer being impregnated with from about 3% to about 7% of said volatile blowing agent selected from the inert organic materials consisting of $C_2$–$C_7$ hydrocarbons, halogenated hydrocarbons, ethers, and mixtures thereof, said organic material having a volatility within the volatility range of said $C_2$–$C_7$ hydrocarbons; the improvement which consists of bead surface deposits of a complex of an aluminum salt with collagen having a molecular weight of at least 60,000, said deposits being present on the bead surface in measurable amounts and being adhered sufficiently tenaciously to resist mild washing and said deposits promoting the formation of prepuffed particles having significantly fewer lumps than the prepuffed particles derived from the corresponding beads lacking such deposits, and said deposits promoting the formation of prepuffed particles passing static electrical tests better than prepuffed particles derived from corresponding beads lacking such deposits.

Various modifications of the invention are possible without departing from the scope of the claims.

I claim:

1. In a method for the preparation of expandable polystyrene beads, the combination of steps which includes:

preparing an aqueous system containing from about 0.02 to about 1% collagen having an average molecular weight of at least 60,000;

preparing the complex resulting from the interaction of an introduced aluminum ion of a water soluble aluminum salt with said collagen in said aqueous system, the weight concentration of the aluminum ion introduced being from about 20% to about 200% of the weight concentration of the collagen;

agitating and dispersing said complex in said aqueous system;

suspending approximately spherical beads of a polymer which is predominantly polystyrene in said agitated dispersion, relying upon said complex as the major suspending agent, the aqueous suspension of the beads being in an impregnation vessel;

introducing blowing agent into said impregnation vessel containing said aqueous suspension of beads and controlling the sequence of pressure and temperture to impregnate blowing agent into said beads and to cool the impregnated beads, the said blowing agent being selected from the inert organic materials consisting of $C_2$–$C_7$ hydrocarbons, halogenated hydrocarbons having a volatility within the volatility range of said $C_2$–$C_7$ hydrocarbons ethers having a volatility range of said $C_2$–$C_7$ hydrocarbons, and mixtures thereof, said impregnation introducing from about 3% to about 7% blowing agent into said beads;

draining aqueous material from the impregnated beads and removing said impregnated beads from said impregnating vessel and washing the beads, a measurable amount of said complex of collagen and aluminum salt being a wash-resistant deposit on the exterior of the bead;

and withdrawing said washed beads as the product of the method, said beads being suitable for the molding of an article having a predominant volume of cellular polystyrene by steps comprising pre-expanding beads at a temperature in the temperature range embraced by low pressure steam to prepare pre-puffed particles, filling a mold with said prepuffed particles, and subjecting the mold to heating and cooling to form said article, said beads having surface deposits of a complex of an aluminum salt and a collagen having a molecular weight of at least 60,000, said deposits being present on the bead surface in measurable amounts and being adhered sufficiently tenaciously to resist mild washing and said deposits promoting the formation of prepuffed particles having significantly fewer lumps than the prepuffed particles derived from corresponding beads lacking such deposits, and said prepuffed particles passing static electrical tests better than the prepuffed particles derived from corresponding beads lacking such deposits.

2. In a bead suitable for the production of a predominantly polystyrene cellular article by steps comprising pre-expanding beads at a temperature in the range of low pressure steam to prepare prepuffed particles, filling a mold with said prepuffed particles, and subjecting the mold to heating and cooling to form said cellular article, the main body of said bead consisting essentially of a blowing agent and a polymer which is predominantly polystyrene, such polymer being impregnated with from about 3% to about 7% of said volatile blowing agent selected from the inert organic materials consisting of $C_2$–$C_7$ hydrocarbons, halogenated hydrocarbons, ethers, and mixtures thereof, said organic material having a volatility within the volatility range of said $C_2$–$C_7$ hydrocarbons, the improvement which consists of bead surface deposits of a complex of an aluminum salt with collagen havng a molecular weight of at least 60,000, said deposits being present on the bead surface in measurable amounts and being adhered sufficiently tenaciously to resist mild washing and said deposits promoting the formation of prepuffed particles having significantly fewer lumps than the prepuffed particles derived from the corresponding beads lacking such deposits, and said deposits promoting the formation of prepuffed particles passing static electrical tests better than prepuffed particles derived from corresponding beads lacking such deposits.

* * * * *